United States Patent
Sivaraj et al.

(10) Patent No.: US 11,990,832 B2
(45) Date of Patent: May 21, 2024

(54) MULTI-MODE TRANSITION FOR A DC-DC CONVERTER

(71) Applicant: NXP USA, Inc., Austin, TX (US)

(72) Inventors: Mahraj Sivaraj, Cedar Park, TX (US); John Pigott, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 255 days.

(21) Appl. No.: 17/694,520

(22) Filed: Mar. 14, 2022

(65) Prior Publication Data
US 2023/0291301 A1    Sep. 14, 2023

(51) Int. Cl.
*H02M 1/08* (2006.01)
*H02M 1/088* (2006.01)
*H02M 3/158* (2006.01)

(52) U.S. Cl.
CPC ........... *H02M 1/088* (2013.01); *H02M 3/158* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H05B 39/048; B23K 11/24; H04B 2215/069
See application file for complete search history.

(56) References Cited

U.S. PATENT DOCUMENTS

| | | | |
|---|---|---|---|
| 7,382,114 B2 | 6/2008 | Groom | |
| 8,928,299 B2 | 1/2015 | Matzberger et al. | |
| 9,502,974 B2 | 11/2016 | Archibald | |
| 11,476,769 B2 * | 10/2022 | Mayell | H02M 3/01 |
| 2010/0320986 A1 | 12/2010 | Collins | |

(Continued)

*Primary Examiner* — Jeffrey A Gblende

(57) ABSTRACT

Embodiments of a multi-mode transition circuit for a DC-DC converter and a DC-DC converter are disclosed. In an embodiment, a multi-mode transition circuit for a DC-DC converter includes a transconductance amplifier operably connected to a first resistor-capacitor (RC) network and switches, a comparator operably connected to a second RC network, where the first and second RC networks are operably connected to a reference voltage, a multiplexer operably connected to the transconductance amplifier and the comparator, and an operation mode selector configured to enable or disable the transconductance amplifier and turn on or off the switches in a sequence when transitioning between a pulse-frequency modulation (PFM) mode and a pulse-width modulation (PWM) mode.

20 Claims, 2 Drawing Sheets

(56) References Cited

U.S. PATENT DOCUMENTS

2020/0127566 A1\* 4/2020 Lazaro ................ H02M 1/0061
2022/0239228 A1\* 7/2022 Fukushima ......... H02M 3/1588
2023/0188037 A1\* 6/2023 Priego ................... H02M 3/156
                                                            323/272

\* cited by examiner

MULTI-MODE TRANSITION FOR A DC-DC CONVERTER

BACKGROUND

A direct current (DC)-DC converter converts a DC power source from one voltage level to another. A DC-DC converter may operate under different operational modes. For example, a DC-DC converter can operate under a pulse-width modulation (PWM) mode in which a duty cycle of the DC-DC converter is varied to control an output voltage of the DC-DC converter. Alternatively, a DC-DC converter can operate under a pulse-frequency modulation (PFM) mode or a pulse skipping mode in which an on-time of the DC-DC converter is predetermined (e.g., fixed) while conduction is provided in one or more repeated pulses or bursts to maintain an output voltage of the DC-DC converter within a voltage window.

In a DC-DC converter that can alternate between PWM and PFM modes, transition between PWM and PFM modes can introduce voltage transients in a reference signal, which can cause an incorrect regulation of the output voltage of the DC-DC converter for a time after the transition. For example, under a PFM mode of a DC-DC converter, a transconductance amplifier ($g_m$ amplifier) of the DC-DC converter may be disabled to save current consumption, and enabling or disabling the $g_m$ amplifier can generate large voltage transients in a reference voltage delivered to an amplifier or a comparator, which can cause an incorrect regulation of the output voltage of the DC-DC converter for a time after a transition between a PWM mode and the PFM mode.

SUMMARY

Embodiments of a multi-mode transition circuit for a DC-DC converter and a DC-DC converter are disclosed. In an embodiment, a multi-mode transition circuit for a DC-DC converter includes a transconductance amplifier operably connected to a first resistor-capacitor (RC) network and switches, a comparator operably connected to a second RC network, where the first and second RC networks are operably connected to a reference voltage, a multiplexer operably connected to the transconductance amplifier and the comparator, and an operation mode selector configured to enable or disable the transconductance amplifier and turn on or off the switches in a sequence when transitioning between a PFM mode and a PWM mode. Other embodiments are also described.

In an embodiment, the operation mode selector is further configured to disable the transconductance amplifier when transitioning from the PWM mode to the PFM mode.

In an embodiment, the operation mode selector is further configured to enable the transconductance amplifier when transitioning from the PFM mode to the PWM mode.

In an embodiment, the switches include a first switch operably connected to a plurality of input terminals of the transconductance amplifier and the comparator, a second switch operably connected between a plurality of input terminals of the transconductance amplifier, a third switch operably connected to the first RC network, and a fourth switch operably connected to a second reference voltage.

In an embodiment, the operation mode selector is further configured to turn off the first and third switches and subsequently turn on the second and fourth switches when transitioning from the PWM mode to the PFM mode.

In an embodiment, the operation mode selector is further configured to disable the transconductance amplifier when transitioning from the PWM mode to the PFM mode after the first and third switches are turned off and the second and fourth switches are turned on.

In an embodiment, the operation mode selector is further configured to turn off the second and fourth switches and subsequently turn on the first and third switches when transitioning from the PFM mode to the PWM mode.

In an embodiment, the operation mode selector is further configured to enable the transconductance amplifier prior to the second and fourth switches are turned off and the first and third switches are turned on when transitioning from the PFM mode to the PWM mode.

In an embodiment, the operation mode selector is further configured to wait for a predefined time period after the transconductance amplifier is enabled and prior to the second and fourth switches are turned off and the first and third switches are turned on when transitioning from the PFM mode to the PWM mode.

In an embodiment, the multi-mode transition circuit further includes a voltage source and a resistor network configured to generate the reference voltage.

In an embodiment, an output signal of the DC-DC converter is fed back to input terminals of the transconductance amplifier and the comparator.

In an embodiment, the multi-mode transition circuit further includes a second comparator connected between the transconductance amplifier and the multiplexer.

In an embodiment, a multi-mode transition circuit for a DC-DC converter includes a transconductance amplifier operably connected to a first RC network and switches, a comparator operably connected to a second RC network, a multiplexer operably connected to the transconductance amplifier and the comparator, and an operation mode selector configured to enable or disable the transconductance amplifier, turn on or off the switches in a sequence, and control the multiplexer when transitioning between a PFM mode and a PWM mode. The first and second RC networks are operably connected to a reference voltage, and where an output signal of the DC-DC converter is fed back to input terminals of the transconductance amplifier and the comparator.

In an embodiment, the operation mode selector is further configured to disable the transconductance amplifier when transitioning from the PWM mode to the PFM mode and to enable the transconductance amplifier when transitioning from the PFM mode to the PWM mode.

In an embodiment, the switches include a first switch operably connected to the input terminals of the transconductance amplifier and the comparator, a second switch operably connected between input terminals of the transconductance amplifier, a third switch operably connected to the first RC network, and a fourth switch operably connected to a second reference voltage.

In an embodiment, the operation mode selector is further configured to turn off the first and third switches and subsequently turn on the second and fourth switches when transitioning from the PWM mode to the PFM mode.

In an embodiment, the operation mode selector is further configured to turn off the second and fourth switches and subsequently turn on the first and third switches when transitioning from the PFM mode to the PWM mode.

In an embodiment, the multi-mode transition circuit further includes a voltage source and a resistor network configured to generate the reference voltage.

In an embodiment, a DC-DC converter includes a transconductance amplifier operably connected to a first RC network and switches, a comparator operably connected to a second RC network, wherein the first and second RC networks are operably connected to a reference voltage, a multiplexer operably connected to the transconductance amplifier and the comparator, an operation mode selector configured to enable or disable the transconductance amplifier and turn on or off the switches in a sequence when transitioning between a PFM mode and a PWM mode, and a power stage and an inductor-capacitor (LC) network connected to the multiplexer and configured to convert an input signal with an input direct current (DC) voltage into an output signal with an output DC voltage.

In an embodiment, the operation mode selector is further configured to disable the transconductance amplifier when transitioning from the PWM mode to the PFM mode and to enable the transconductance amplifier when transitioning from the PFM mode to the PWM mode.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
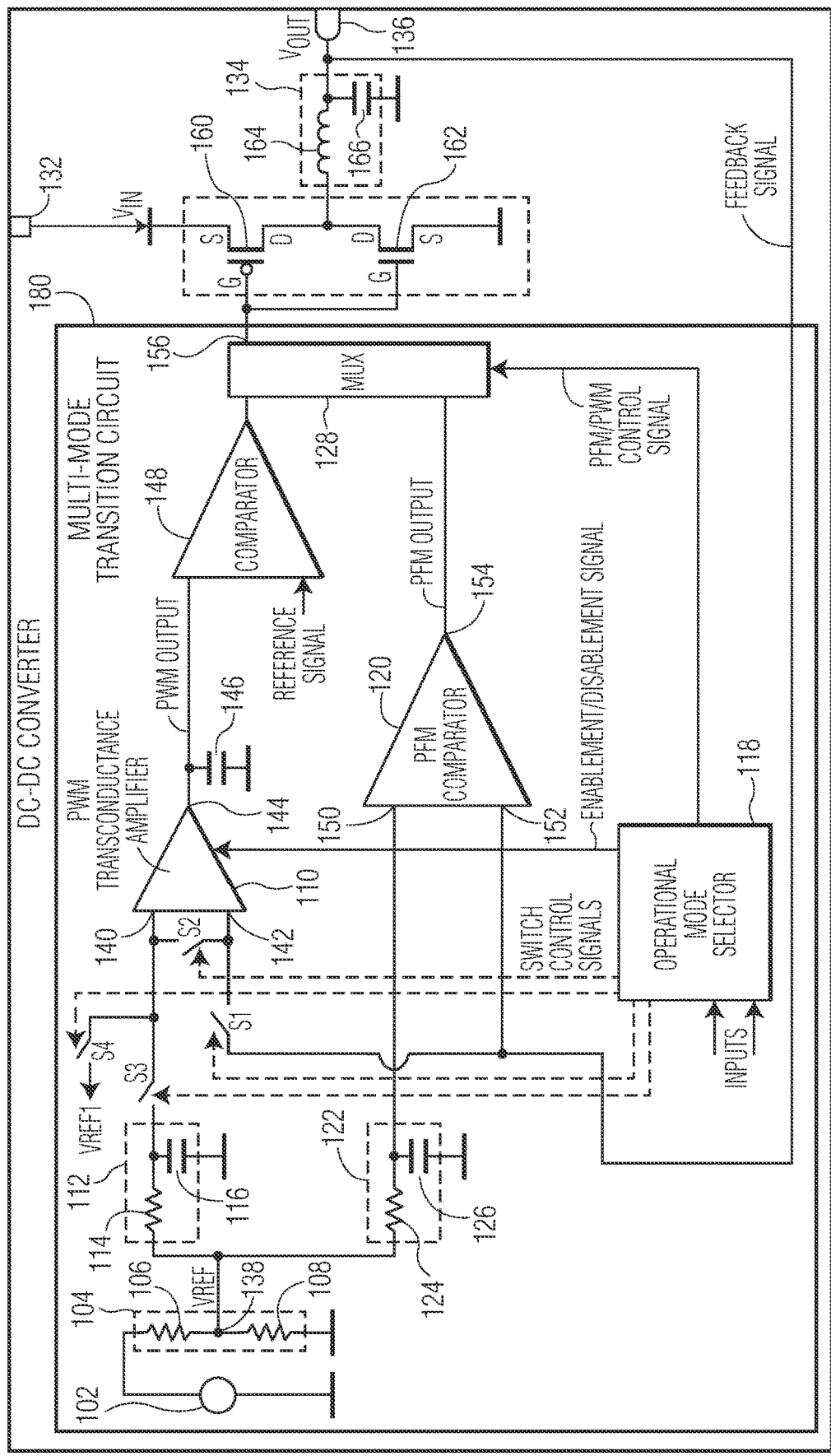
FIG. 1 is a schematic block diagram of a DC-DC converter in accordance with an embodiment of the invention.

FIG. 1 is a schematic block diagram of a DC-DC converter 100 in accordance with an embodiment of the invention. The DC-DC converter converts an input signal with an input DC voltage, $V_{in}$, into an output signal with a desired output DC voltage, $V_{out}$. The DC-DC converter can be used in various applications, such as automotive applications, communications applications, industrial applications, medical applications, computer applications, and/or consumer or appliance applications. In the embodiment depicted in FIG. 1, the DC-DC converter includes a voltage source 102, a resistor network 104 that includes resistors 106, 108, a PWM transconductance amplifier ($g_m$ amplifier) 110, a resistor-capacitor (RC) network 112 for the PWM transconductance amplifier 110 that includes a resistor 114 and a capacitor 116, an operational mode selector 118, a PFM comparator 120, an RC network 122 for the PFM comparator that includes a resistor 124 and a capacitor 126, switches, S1, S2, S3, S4, a multiplexer (MUX) 128, a power stage 130 connected to an input terminal 132 that is configured to receive an input DC signal with an input voltage, $V_{IN}$, and an LC network 134 connected to an output terminal 136 from which an output DC signal with an output voltage, $V_{OUT}$, is output. In some embodiments, the DC-DC converter is included in a computing device, such as a smartphone, a tablet computer, a laptop, etc. In some embodiments, the DC-DC converter is implemented in a substrate, such as a semiconductor wafer or a printed circuit board (PCB). In an embodiment, the DC-DC converter is packaged as a stand-alone semiconductor IC chip. In some embodiments, the DC-DC converter is a Buck DC-DC converter in which the input voltage, $V_{IN}$, is higher than the output voltage, $V_{OUT}$. Although the DC-DC converter is shown in FIG. 1 as including certain circuit elements, in other embodiments, the DC-DC converter may include one or more additional circuit elements. For example, the DC-DC converter may include another reference voltage generator configured to generate a reference voltage for the $g_m$ amplifier 110. In another example, the DC-DC converter may include a clock signal generator configured to generate a clock signal for the PFM comparator 120.

In the embodiment depicted in FIG. 1, the voltage source 102, the resistor network 104 that includes the resistors 106, 108, the PWM transconductance amplifier 110, the RC network 112 for the PWM transconductance amplifier 110, the operational mode selector 118, the PFM comparator 120, the RC network 122 for the PFM comparator 120, the switches, S1, S2, S3, S4, and the multiplexer (MUX) 128 are included in a multi-mode transition circuit 180. In an embodiment, the multi-mode transition circuit 180 is packaged as a semiconductor IC chip. For example, the multi-mode transition circuit 180 may be packaged as a first semiconductor IC chip, while the power stage 130 and the LC network 134 may be packaged as a second semiconductor IC chip. In some embodiments, the multi-mode transition circuit 180, the power stage 130, and the LC network 134 are packaged in the substrate of the same semiconductor IC chip.

Figure 2:
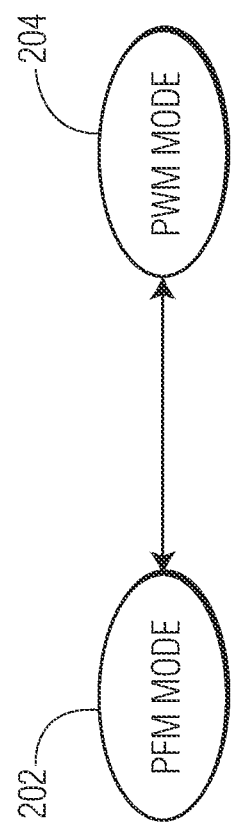
FIG. 2 illustrates a state machine diagram of the DC-DC converter depicted in FIG. 1.

The DC-DC converter 100 is configured to operate in different operational modes. FIG. 2 illustrates a state machine diagram of the DC-DC converter 100 depicted in FIG. 1. In the state machine diagram of FIG. 2, the DC-DC converter 100 is configured to transition or switch between a PFM mode 202 in which an on-time of the DC-DC converter is predetermined (e.g., fixed) while conduction is provided in one or more pulses or bursts to maintain the output voltage, $V_{OUT}$, of the DC-DC converter within a voltage window, for example, when the DC-DC converter is operated with reduced loads (i.e., reduced output currents) and a PWM mode 204 in which a duty cycle of the DC-DC converter is varied to control an output voltage of the DC-DC converter, for example, when the DC-DC converter is operated with heavy loads (i.e., high output currents) to achieve high efficiencies (e.g., greater than 90%).

Turning back to FIG. 1, in the embodiment depicted in FIG. 1, the operational mode selector 118 is configured to control the DC-DC converter 100 to operate under the PFM mode 202 or to operate under the PWM mode 204. For example, the operational mode selector 118 is configured to control the PWM transconductance amplifier 110 and the switches, S1, S2, S3, S4, to transition between the PWM and PFM modes, for example, based on one or more input signals. As described in details below, voltage transients caused by transition between the PWM and PFM modes (e.g., voltage transients caused by enabling or disabling the $g_m$ amplifier 110) can be reduced by controlling the switches, S1, S2, S3, S4. Consequently, an incorrect regulation of the output voltage, $V_{OUT}$, of the DC-DC converter 100 after a transition between the PWM mode 204 and the PFM mode 202 can be reduced. In some embodiments, the operational mode selector 118 is configured to enable or disable the PWM transconductance amplifier 110 and turn on or off the switches, S1, S2, S3, S4, in a sequence when transitioning between the PFM mode 202 and the PWM mode 204. In some embodiments, the operational mode selector 118 is further configured to disable the PWM transconductance amplifier 110 when transitioning from the PWM mode 204 to the PFM mode 202. In some embodiments, the operational mode selector 118 is further configured to enable the PWM transconductance amplifier 110 when transitioning from the PFM mode 202 to the PWM mode 204. The operational mode selector 118 may be implemented using one or more circuits (e.g., one or more digital circuits). In some embodiments, the operational mode selector is implemented using a processor such as a microcontroller or a central processing unit (CPU).

In the embodiment depicted in FIG. 1, the voltage source 102 configured to generate a reference voltage, which is input into the resistor network 104 that includes the resistors 106, 108. A reference voltage, $V_{REF}$, of a node 138 that is between the resistors 106, 108 is input to the RC network 112 for the PWM transconductance amplifier 110 and the RC network 122 for the PFM comparator 120.

In the embodiment depicted in FIG. 1, the PWM transconductance amplifier ($g_m$ amplifier) 110 has an input terminal 140 connected to the resistor 114 and the capacitor 116 of the RC network 112, which is connected to a fixed voltage (e.g., the ground (0 volt)) through the switch, S3, and to a reference voltage, $V_{REF1}$, having a voltage level that is approximately (e.g., ±5%) the voltage level of the reference voltage, $V_{REF}$, and may be generated by a voltage source. In addition, the PWM transconductance amplifier 110 has another input terminal 142 that is connected to a feedback signal (e.g., the output voltage, $V_{OUT}$), through the switch, S1. The switch, S2, is connected between the input terminals 140, 142 of the PWM transconductance amplifier 110. The PWM transconductance amplifier 110 has an output terminal 144 from which the output signal of the PWM transconductance amplifier 110 is outputted. The output terminal 144 may be connected to a capacitor 146, which is connected to a fixed voltage such as the ground and connected to a comparator 148 that is configured to compare the output signal of the PWM transconductance amplifier 110 with a reference signal, for example, a reference signal with a sawtooth waveform or other suitable waveform, to generate a comparison output digital signal that is inputted into the MUX 128.

In the embodiment depicted in FIG. 1, the PFM comparator 120 has an input terminal 150 connected to the resistor 124 and the capacitor 126 of the RC network 122, which is connected to a fixed voltage (e.g., the ground (0 volt)). In addition, the PFM comparator 120 has another input terminal 152 that is connected to a feedback signal (e.g., the output voltage, $V_{OUT}$, of the DC-DC converter 100), and the input terminal 142 of the PWM transconductance amplifier 110 through the switch, S1. The PFM comparator 120 has an output terminal 154 that is connected to the multiplexer 128.

In the embodiment depicted in FIG. 1, the multiplexer 128 is connected to the output terminals 144, 154 of the PWM transconductance amplifier 110 and the PFM comparator 120 and the operational mode selector 118. The multiplexer 128 may be configured to receive the output signal of the PFM comparator 120 and the output signal of the comparator 148 connected to the PWM transconductance amplifier 110 and is controlled by a PFM/PWM control signal that is generated by the operational mode selector 118, for example, to select one of the as its output.

In the embodiment depicted in FIG. 1, the power stage 130 is connected to an output terminal 156 of the multiplexer 128 and the LC network 134. In some embodiments, the power stage 130 and the LC network 134 are configured to convert the input DC signal with the input voltage, $V_{IN}$, into the output DC signal with the output voltage, $V_{OUT}$, using semiconductor devices (e.g., transistors such as power metal-oxide-silicon field-effect (MOSFET) transistors) that may be connected in series (stacked) or connected in parallel with each other. In the embodiment depicted in FIG. 1, the power stage 130 includes a P-channel metal-oxide-semiconductor (PMOS) transistor 160 and an N-channel metal-oxide-semiconductor (NMOS) transistor 162 that are connected between the input terminal 132 that is configured to receive the input DC signal with the input voltage, $V_{IN}$, and a fixed voltage, for example, the ground. Specifically, the gate terminals, G, of the PMOS transistor 160 and the NMOS transistor 162 are connected to the multiplexer 128, the drain terminal, D, of the PMOS transistor 160 and the drain terminal, D, of the NMOS transistor 162 are connected to an inductor 164 of the LC network 134, the source terminal, S, of the PMOS transistor 160 is connected to the input terminal 132 from which the input DC signal with the input voltage, $V_{IN}$, is received, and the source terminal, S, of the NMOS transistor 162 is connected to a fixed voltage, for example, the ground. Although the power stage 130 is shown in FIG. 1 as including certain circuit elements, in other embodiments, the power stage 130 may be implemented differently from the embodiment depicted in FIG. 1.

In the embodiment depicted in FIG. 1, the inductor 164 and a capacitor 166 of the LC network 134 are connected to the output terminal 136 from which the output DC signal with the output voltage, $V_{OUT}$, is output. Although the LC network 134 is shown in FIG. 1 as including certain circuit elements, in other embodiments, the LC network 134 may be implemented differently from the embodiment depicted in FIG. 1.

In the DC-DC converter 100 depicted in FIG. 1, the PWM transconductance amplifier 110 typically has large input transistors, which generate large charge injection transients when the PWM transconductance amplifier 110 is enabled or disabled. The generated charge injection transients can couple back through the RC network 112 to the reference voltage, $V_{REF}$, and corrupt the shared reference voltage, $V_{REF}$, between the PFM comparator and the PWM transconductance amplifier 110 for the PFM comparator 120 and corrupt the output regulation of the PFM comparator 120. In order to reduce or minimize quiescent current consumption (e.g., 10 microampere (µA) in total), in some embodiments, under the PFM mode 202, the PWM transconductance amplifier 110 is disabled by the operational mode selector 118. Under the PFM mode 202, the PFM comparator 120 drives the power stage 130 and the PWM amplifier is disabled by the operational mode selector 118. Specifically, the switch, S1, is open (i.e., non-conductive), the switch, S2, is closed (i.e., conductive), the switch, S3, is open (i.e., non-conductive), and the switch, S4, is closed (i.e., conductive), to connect the PWM transconductance amplifier 110 to a convenient voltage, $V_{REF1}$, that is usually similar to the reference voltage, $V_{REF}$, for example, based on switch control signals from the operational mode selector 118. Under the PWM mode 204, the PFM comparator 120 may remain enabled as current consumption is not as critical under the PFM mode. When transitioning from the PFM mode 202 to the PWM mode 204, the following sequence occurs:
1) the operational mode selector 118 enables the PWM transconductance amplifier 110;
2) The PWM transconductance amplifier generates a voltage transient at its input terminals;
3) subsequently, the operational mode selector 118 waits for settling of the transient at the input terminals of the PWM transconductance amplifier 110;
4) subsequently, the operational mode selector 118 opens the switch, S2, and the switch, S4, either sequentially or simultaneously, and subsequently closes the switches, S3, S1, for example, based on switch control signals from the operational mode selector 118;
5) subsequently, the operational mode selector 118 uses the multiplexer 128 to switch control from the PFM mode to the PWM mode, for example, based on a PFM/PWM control signal from the operational mode selector 118.

When transitioning from the PWM mode 204 to the PFM mode 202, the following sequence (essentially the above in reverse) occurs:
1) the operational mode selector 118 uses the multiplexer 128 to switch control from the PWM mode to the PFM mode, for example, based on a PFM/PWM control signal from the operational mode selector 118;
2) subsequently, the operational mode selector 118 opens the switch, S3, and the switch, S1, either sequentially or simultaneously, and subsequently closes the switches, S2, S4, for example, based on switch control signals from the operational mode selector 118;
3) subsequently, the operational mode selector 118 disables the PWM transconductance amplifier 110.

These sequences ensure that glitches generated by enabling or disabling the PWM transconductance amplifier 110 are not injected into the shared reference or feedback lines, thus maintaining accurate voltage regulation during control transitions.

It should be noted that at least some of the operations described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A multi-mode transition circuit for a DC-DC converter, the multi-mode transition circuit comprising:
a transconductance amplifier operably connected to a first resistor-capacitor (RC) network and a plurality of switches;
a comparator operably connected to a second RC network, wherein the first and second RC networks are operably connected to a reference voltage;
a multiplexer operably connected to the transconductance amplifier and the comparator; and
an operation mode selector configured to enable or disable the transconductance amplifier and turn on or off the switches in a sequence when transitioning between a pulse-frequency modulation (PFM) mode and a pulse-width modulation (PWM) mode.

2. The multi-mode transition circuit of claim 1, wherein the operation mode selector is further configured to disable the transconductance amplifier when transitioning from the PWM mode to the PFM mode.

3. The multi-mode transition circuit of claim 2, wherein the operation mode selector is further configured to enable the transconductance amplifier when transitioning from the PFM mode to the PWM mode.

4. The multi-mode transition circuit of claim 1, wherein the switches comprise:
a first switch operably connected to a plurality of input terminals of the transconductance amplifier and the comparator;
a second switch operably connected between a plurality of input terminals of the transconductance amplifier;

a third switch operably connected to the first RC network; and a fourth switch operably connected to a second reference voltage.

5. The multi-mode transition circuit of claim 4, wherein the operation mode selector is further configured to turn off the first and third switches and subsequently turn on the second and fourth switches when transitioning from the PWM mode to the PFM mode.

6. The multi-mode transition circuit of claim 5, wherein the operation mode selector is further configured to disable the transconductance amplifier when transitioning from the PWM mode to the PFM mode after the first and third switches are turned off and the second and fourth switches are turned on.

7. The multi-mode transition circuit of claim 4, wherein the operation mode selector is further configured to turn off the second and fourth switches and subsequently turn on the first and third switches when transitioning from the PFM mode to the PWM mode.

8. The multi-mode transition circuit of claim 6, wherein the operation mode selector is further configured to enable the transconductance amplifier prior to the second and fourth switches are turned off and the first and third switches are turned on when transitioning from the PFM mode to the PWM mode.

9. The multi-mode transition circuit of claim 8, wherein the operation mode selector is further configured to wait for a predefined time period after the transconductance amplifier is enabled and prior to the second and fourth switches are turned off and the first and third switches are turned on when transitioning from the PFM mode to the PWM mode.

10. The multi-mode transition circuit of claim 1, further comprising a voltage source and a resistor network configured to generate the reference voltage.

11. The multi-mode transition circuit of claim 1, wherein an output signal of the DC-DC converter is fed back to a plurality of input terminals of the transconductance amplifier and the comparator.

12. The multi-mode transition circuit of claim 1, further comprising a second comparator connected between the transconductance amplifier and the multiplexer.

13. A multi-mode transition circuit for a DC-DC converter, the multi-mode transition circuit comprising:
a transconductance amplifier operably connected to a first resistor-capacitor (RC) network and a plurality of switches;
a comparator operably connected to a second RC network, wherein the first and second RC networks are operably connected to a reference voltage, and wherein an output signal of the DC-DC converter is fed back to a plurality of input terminals of the transconductance amplifier and the comparator;
a multiplexer operably connected to the transconductance amplifier and the comparator; and
an operation mode selector configured to enable or disable the transconductance amplifier, turn on or off the switches in a sequence, and control the multiplexer when transitioning between a pulse-frequency modulation (PFM) mode and a pulse-width modulation (PWM) mode.

14. The multi-mode transition circuit of claim 13, wherein the operation mode selector is further configured to disable the transconductance amplifier when transitioning from the PWM mode to the PFM mode and to enable the transconductance amplifier when transitioning from the PFM mode to the PWM mode.

15. The multi-mode transition circuit of claim 13, wherein the switches comprise:
a first switch operably connected to the input terminals of the transconductance amplifier and the comparator;
a second switch operably connected between a plurality of input terminals of the transconductance amplifier;
a third switch operably connected to the first RC network; and
a fourth switch operably connected to a second reference voltage.

16. The multi-mode transition circuit of claim 15, wherein the operation mode selector is further configured to turn off the first and third switches and subsequently turn on the second and fourth switches when transitioning from the PWM mode to the PFM mode.

17. The multi-mode transition circuit of claim 15, wherein the operation mode selector is further configured to turn off the second and fourth switches and subsequently turn on the first and third switches when transitioning from the PFM mode to the PWM mode.

18. The multi-mode transition circuit of claim 13, further comprising a voltage source and a resistor network configured to generate the reference voltage.

19. A DC-DC converter, the DC-DC converter comprising:
a transconductance amplifier operably connected to a first resistor-capacitor (RC) network and a plurality of switches;
a comparator operably connected to a second RC network, wherein the first and second RC networks are operably connected to a reference voltage;
a multiplexer operably connected to the transconductance amplifier and the comparator;
an operation mode selector configured to enable or disable the transconductance amplifier and turn on or off the switches in a sequence when transitioning between a pulse-frequency modulation (PFM) mode and a pulse-width modulation (PWM) mode; and
a power stage and an inductor-capacitor (LC) network connected to the multiplexer and configured to convert an input signal with an input direct current (DC) voltage into an output signal with an output DC voltage.

20. The DC-DC converter of claim 19, wherein the operation mode selector is further configured to disable the transconductance amplifier when transitioning from the PWM mode to the PFM mode and to enable the transconductance amplifier when transitioning from the PFM mode to the PWM mode.

* * * * *